Dec. 27, 1932.  C. F. WRAY  1,892,418
LIQUID GAUGE
Filed Dec. 24, 1929

INVENTOR
Charles F. Wray
BY
Harold E. Stonebraker
his ATTORNEY

Patented Dec. 27, 1932

1,892,418

UNITED STATES PATENT OFFICE

CHARLES F. WRAY, OF ROCHESTER, NEW YORK, ASSIGNOR TO NATIONAL BRASS MANUFACTURING COMPANY, OF ROCHESTER, NEW YORK, A CORPORATION OF NEW YORK

LIQUID GAUGE

Application filed December 24, 1929. Serial No. 416,226.

This invention relates to improvements in liquid gauges, particularly to that class of liquid gauges employing a transparent tubular member arranged vertically and having its ends connected above and below the normal surface level of a liquid container.

The object of the invention is to construct a gauge of this kind of a few parts, which is simple in construction and which permits the glass tube to be more readily removed or inserted.

To these and other ends, the invention consists in the construction and arrangement of parts that will appear from the following description when read in conjunction with the accompanying drawing, the novel features being pointed out in the claims following the specification.

In the drawing.

Similar reference numerals refer to the same parts in all the figures of the drawing.

Figure 1:
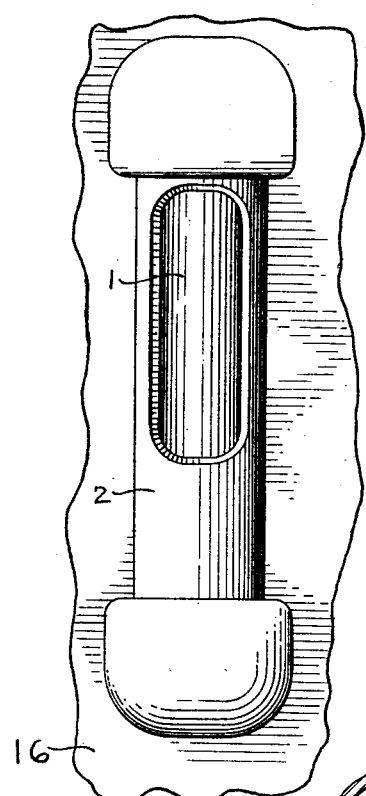
Figure 1 is a front elevation of a liquid gauge constructed according to one embodiment of the invention.

The embodiment of the invention illustrated in the drawing comprises a transparent tubular member 1 preferably constructed of glass and mounted in a tubular guard casing 2 having its walls cut away to expose the glass tube, and adapted to have its ends connected with passages 3 and 4 leading to a liquid container, such as an oil or water vessel.

Figure 3:
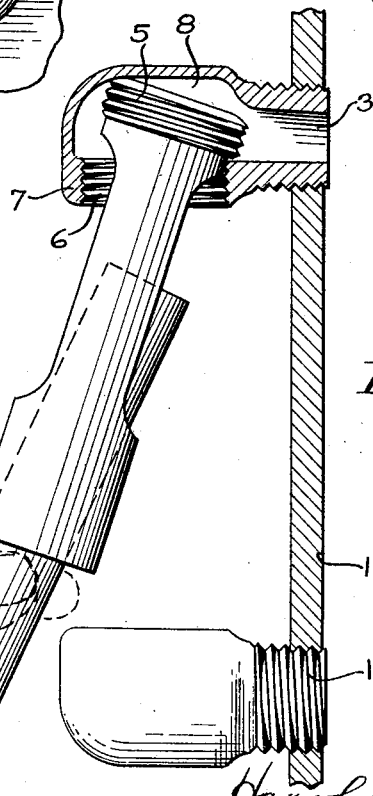
Figure 3 is a side elevation partly in section showing the position of the parts when the transparent tube is being removed or inserted.

The casing 2 is slightly enlarged and externally threaded at one end, preferably its upper end, as at 5 to cooperate with an internally threaded opening 6 in a coupling member 7 having a passageway therethrough. The member 7 comprises a hollow body having an enlarged portion to form a chamber 8 adjacent and above the opening 6 into which cavity the tubular member 2 may project when its threaded portion has passed through the threaded opening 6 and is disengaged therefrom, as shown in Figure 3. The upper end of the guard tube has an inwardly projecting flange 9 having a central opening or port 10 communicating with the housing 8. The threaded part 5 and flange 9 may be formed as a separate member, as shown, and united with the tube by any suitable means, such as brazing or soldering.

The lower end of the tube 1 cooperates with a coupling member 11 having the passage 4 therethrough. The member 11 has a port 12 leading upwardly from the passage 4, and arranged around the port 12 and concentric therewith is a circular depression 13, and concentric with the depression 13 and of larger diameter is a depression 14.

Figure 2:
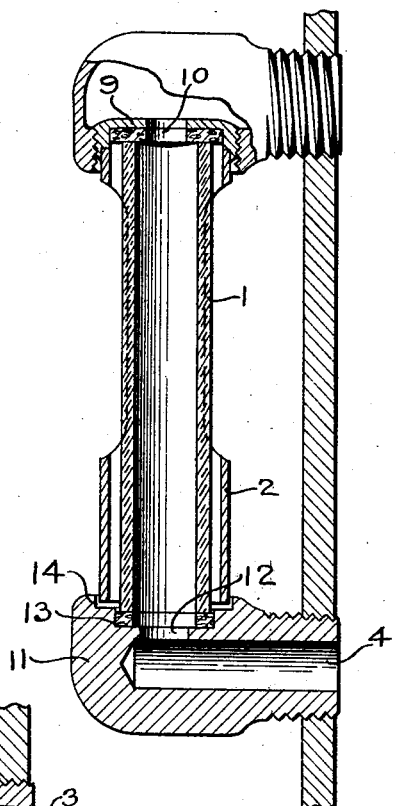
Figure 2 is a side elevation of the same partly in section.

In assembling the device, the coupling member 11 is secured in position by screwing its threaded nipple 15 into a threaded opening in the wall 16 of a vessel adapted to contain liquid, or it may be otherwise connected with a liquid container, and the port 12 communicating with its passageway may be turned upwardly as shown in Figure 2. The coupling 7 is also threaded into a threaded opening in said wall with its threaded opening 6 inclined laterally. It will be noted that the centers of the openings in the wall 16 are in the same vertical plane so that the members 7 and 11 secured therein are also in the same vertical plane. The tubular guard is then threaded into the hollow body or housing 8 and the member 7 turned on its axis until its opening 6 faces the opening 12 in the member 11. The housing 8 provides a clearance for inclining the guard laterally or outwardly, as shown in Figure 3, so that the transparent or glass tube 1 may be inserted therein. The guard 2 is then moved to a vertical position and the glass tube arranged on its seat 13 and the guard screwed into the opening 6 until its flange 9 engages the end of the glass tube and clamps it against its seat 13, and the lower end of the guard engages the seat or depression 14. It will be understood that the ends of the glass tube may engage gaskets or washers, as usual in the art.

It will be noted that the coupling member 7 is formed as a unitary structure in a single piece, and provides a clearance for the guard tube, so that it is only necessary to release the guard tube therefrom and project it into the housing to remove or replace the transparent glass tube.

While only one embodiment of the invention is illustrated herein, it will be understood that this application is intended to cover such changes or modifications as may come within the spirit of the invention or scope of the following claims.

I claim:

1. A liquid gauge comprising a transparent tube, a guard tube therefor, a pair of spaced couplings, one of said couplings having seats for said tubes, and the other coupling having a threaded opening for the guard tube and a chamber adjacent said opening to provide a cavity and permit the guard tube to be projected therein when disengaged from its threaded opening.

2. A liquid gauge comprising a transparent tube, a guard tube therefor having a threaded portion, a pair of couplings, one of said couplings having seats for said tubes, and the other coupling having a threaded opening for cooperation with the threaded portion of the guard tube and a chamber adjacent said opening to provide a cavity and permit one end of the tube to be projected therein when disengaged from its threaded opening to disengage and permit removal of the transparent tube.

3. A liquid gauge comprising a transparent tube, a guard tube therefor having an enlarged threaded portion, and a tube engaging flange at one end, a pair of couplings, one of said couplings having seats for said tubes, and the other coupling having a threaded opening for cooperation with the threaded portion of the guard tube, and a chamber adjacent said opening to provide a cavity into which the threaded end of the guard tube may be projected when disengaged from its threaded opening to permit the guard tube to be inclined to free the transparent tube.

4. A coupling for a liquid gauge comprising a hollow body of unitary structure, there being a threaded opening in the wall of said body for cooperation with the threaded end of a guard tube and through which the threaded end of the tube may be projected into the body when disengaged inwardly from said opening.

5. A liquid gauge comprising a transparent tube, a guard tube therefor, a pair of couplings, one of said couplings having seats for said tubes, interengaging means between the other of said couplings and said guard tube for retaining the guard tube in its seat in the first coupling, said other coupling being enlarged to provide a clearance for the guard tube to move inwardly from engagement with the first coupling.

6. A liquid gauge comprising a transparent tube, a guard tube therefor, a coupling having seats for said tubes, a second coupling, means on said guard tube adapted to directly engage the second coupling for retaining the guard tube in its seat in the first coupling, said second coupling being so constructed that the guard tube may be inclined laterally from its seat in the first coupling for replacing the transparent tube therein when the guard tube is disengaged inwardly therefrom.

7. A liquid gauge comprising a transparent tube, a guard tube therefor, a coupling having seats for said tubes, a second coupling having a threaded opening therein, threads on said guard tube adapted to engage the threads in said opening for retaining the guard tube in its seat in the first coupling, said guard tube being disengageable inwardly into said second coupling from said threads and the first coupling for replacing the transparent tube therein.

In witness whereof, I have hereunto signed my name.

CHARLES F. WRAY.